United States Patent

[11] 3,610,384

| [72] | Inventor | Howard O. Borck<br>Detroit, Mich. |
|------|----------|-----------------------------------|
| [21] | Appl. No. | 44,494 |
| [22] | Filed | June 8, 1970 |
| [45] | Patented | Oct. 5, 1971 |
| [73] | Assignee | Borg-Warner Corporation<br>Chicago, Ill.<br>Continuation-in-part of application Ser. No. 855,650, Sept. 5, 1969, now abandoned. |

[54] FLUID COOLED CLUTCH
38 Claims, 8 Drawing Figs.

[52] U.S. Cl. .................................................... 192/113 B, 192/98, 415/89
[51] Int. Cl. .................................................... F16d 13/72
[50] Field of Search .......................................... 192/113 B, 105 A, 85 F

[56] References Cited
UNITED STATES PATENTS

| 2,210,416 | 8/1940 | Kiep et al. ............ | 192/105 A |
| 2,788,877 | 4/1957 | Richardson ............ | 192/113 |
| 3,474,888 | 10/1969 | Carlson et al. ............ | 192/113 |

*Primary Examiner*—Benjamin W. Wyche
*Attorneys*—Donald W. Banner, John W. Butcher and William S. McCurry ABSTRACT: A liquid cooled friction clutch system in which a pitot tube pump, attached to a release mechanism, has an inlet end disposed in the path of a rotating body of cooling fluid which forms an annular band around the inner periphery of a cover plate assembly. The pump directs fluid from the cover plate through a cooler and then to a fluid reservoir from which it is directed through a control valve to flow across the friction facings of a driven member. Valve means in said system limits the fluid pressure to a predetermined maximum irrespective of the engine speed, thus limiting the flow through the system to a predetermined value.

INVENTOR
HOWARD O. BORCK
BY Dennis M. McWilliams
ATTORNEY

FLUID COOLED CLUTCH

This application is a continuation-in-part application of Ser. No. 855,650 which was filed on Sept. 5, 1969 and now abandoned.

SUMMARY OF THE INVENTION

This invention relates to wet clutch systems and more particularly, to wet clutch systems of the dry housing type.

With conventional clutches, the heat generated during heavy-duty operations soon results in severely limited clutch life due to facing break down. Certain modifications such as ventilating the bell housing and increasing the axle ratio extend clutch life, but it still falls far below an acceptable level.

A wet clutch which utilizes an oil circulating and cooling system keeps the friction surfaces constantly bathed in cooling oil to carry off the heat generated. Such a system will result in an increased clutch life over conventional dry clutches of from 10 to 100 times.

Wet clutch systems known in the art are not without their own inherent problems. Generally, the use of a wet clutch necessitates sealing the starting motor and the many openings on the clutch and flywheel housing. The present invention, however, provides a system whereby all clutch components, release mechanism and circulating pump are confined within a single enclosure which is attached and sealed on the flywheel.

Prior art wet clutch systems also experience a power loss at high speed due to the use of a positive displacement pump whose output is proportional to the engine speed. If the system is set up to provide a sufficient flow of cooling fluid at idle speeds, then at high engine speeds these pumps provide a flow which is far in excess of what is needed requiring additional expenditure of energy by the engine.

The present invention incorporates a simple nonrotating ram tube pump attached to the release carrier which, with the valving shown, regulates the system flow to that sufficient to properly cool the clutch in the kind of service for which it is intended and no more. This arrangement provides sufficient cooling and reduces power loss at high speeds.

DESCRIPTION OF THE PREFERRED EMBODIMENT

Figure 1:
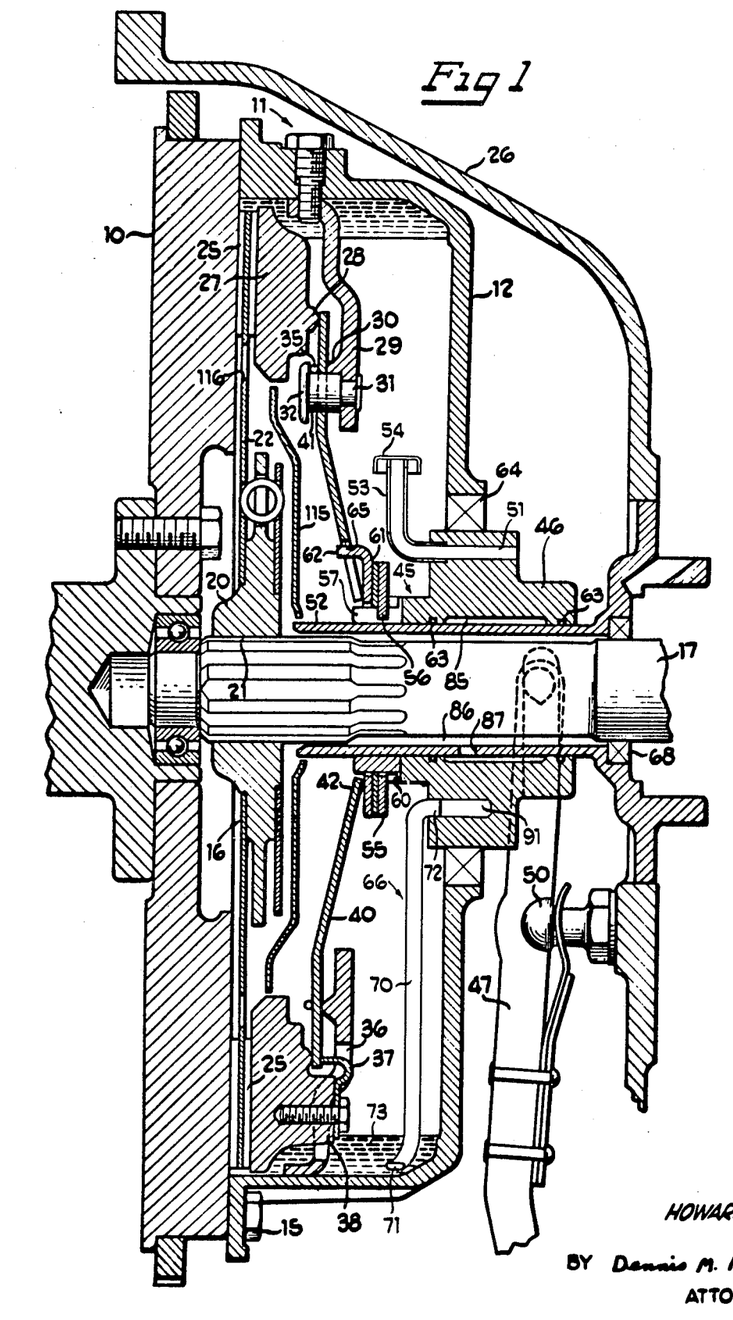
FIG. 1 is a side view partially in section showing one embodiment of the present invention.
Figure 2:
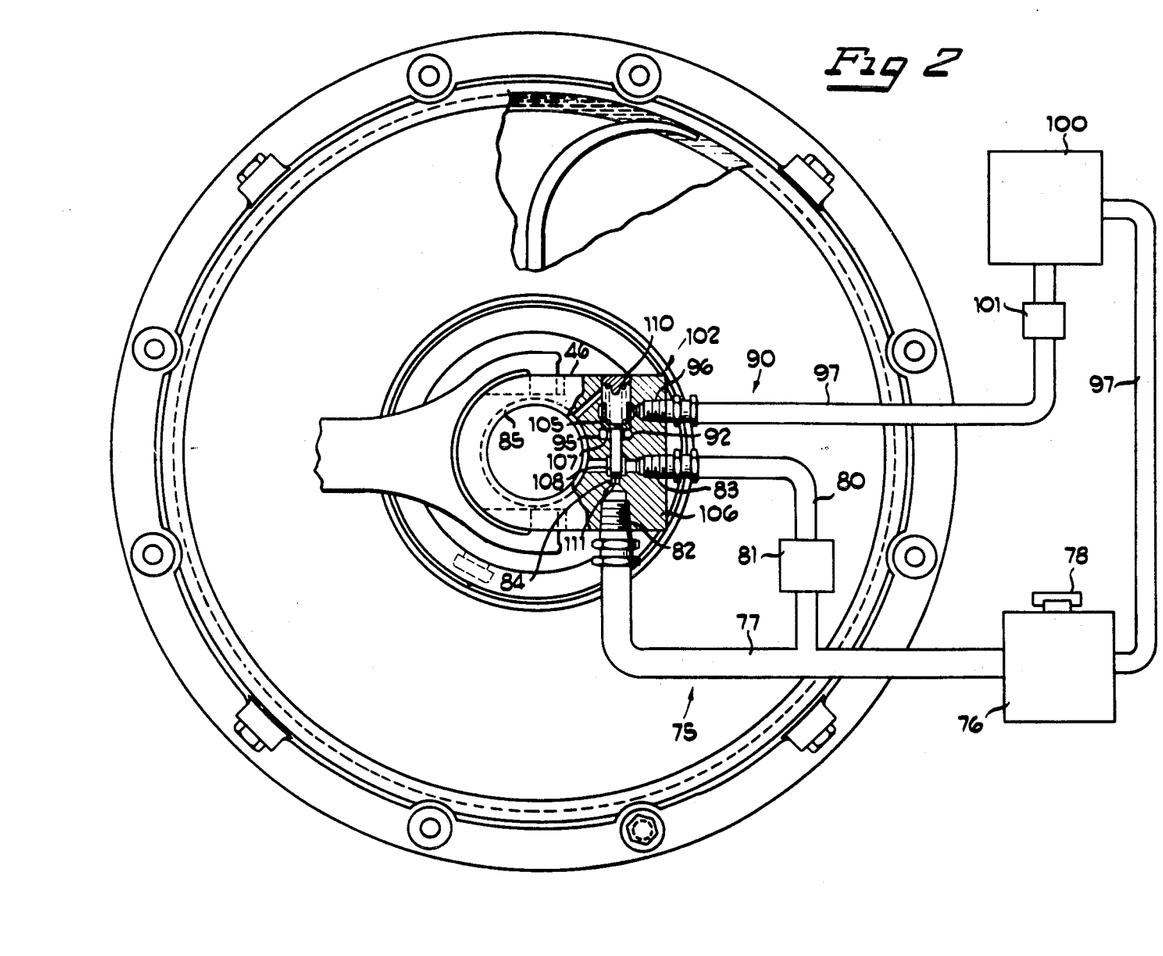
FIG. 2 is a front view partially in section of the present invention.
Figure 3:
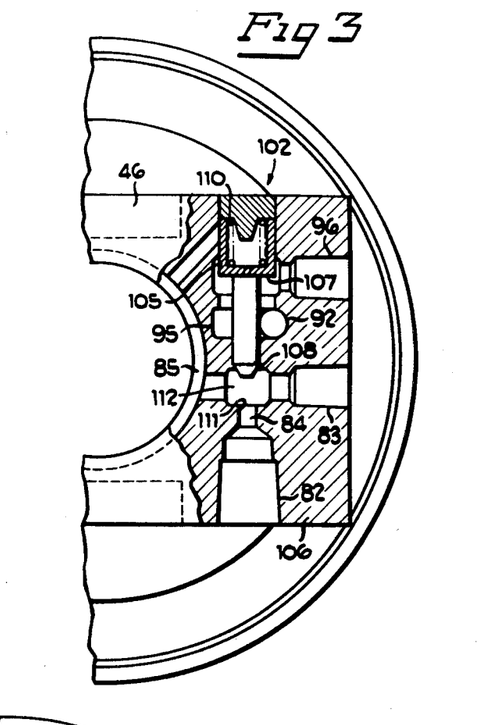
FIG. 3 is an enlarged partial sectional view of the embodiment shown in FIG. 2.
Figure 4:
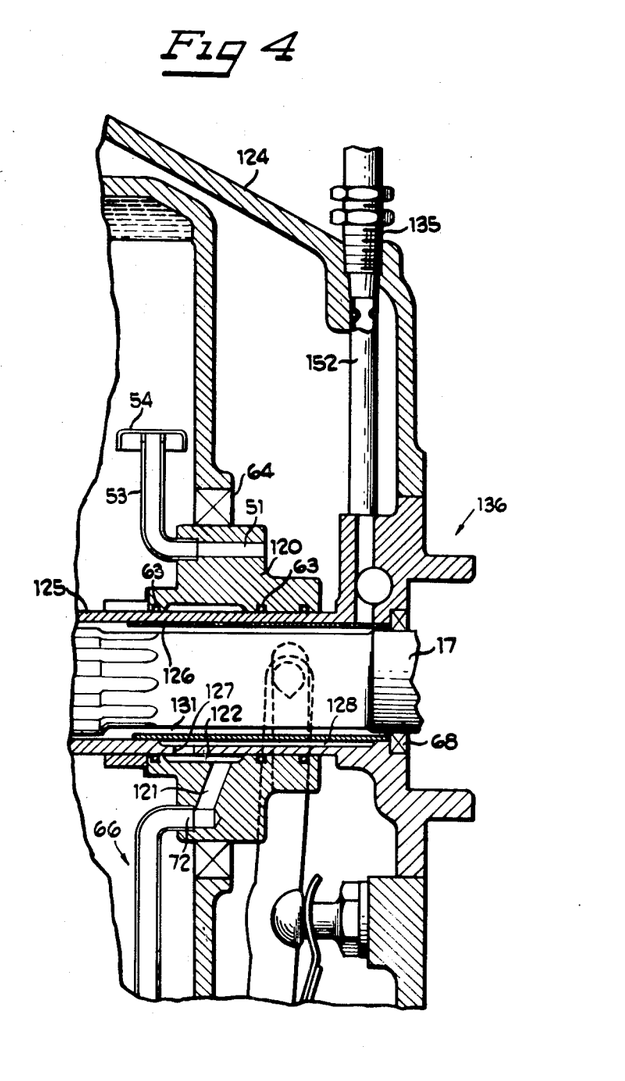
FIG. 4 is a partial sectional view showing a modified embodiment of the present invention.

There is illustrated in FIGS. 1, 2 and 3 one embodiment of a liquid cooled friction clutch system incorporating the principles of the present invention. The system includes a rotary driving member 10 here shown as a flywheel which is adapted to be connected to a prime mover (not shown). Connected to the driving member 10 is a fluidtight cover assembly 11 including a cover plate 12 fastened to the flywheel by a plurality of bolts 15 to form a sealed rotatable chamber. A driven member 16 is shown splined to an output shaft 17 and nonrotatable with respect thereto. The driven member 16 includes an annular hub section 20 defining a plurality of internal splines 21, a radially outwardly extending disc 22 carried on the hub assembly and a pair of grooved friction surfaces 25, one disposed on each side of the radial disc 22. A housing 26 of the dry-sump type is shown enclosing the driving and driven members.

A pressure applying means shown here as a conventional pressure plate 27 is coaxial with said output shaft 17 and adapted to move axially fore and aft to urge said driven member 16 into and out of engagement with said driving member 10. The pressure plate 27 includes an integral circumferential rib 28. The cover plate assembly 11 includes a fulcrum plate 29 mounted to the cover plate 12 and fixed in all directions relative to the cover plate 12. The fulcrum plate 29 includes an integral circumferential rib 30 and a plurality of shoulder rivets 31 affixed to the plate 29. The shoulder rivets 31 include heads 32 which support a round wire hoop 35. A plurality of openings 36 are defined by the fulcrum plate 29. A plurality of spring clips 37 are bolted to the pressure plate 27 and protrude through the opening 36 in the fulcrum plate 29 to retract the pressure plate upon clutch release. Lugs 38 on pressure plate 27 slidably engage openings 36 and form the driving connection between the cover plate assembly 11 and the pressure plate 27.

Resilient means 40, here shown as a diaphragm spring, is positioned at its radially outermost end between the rib 30 of the fulcrum plate 29 and the rib 28 of the pressure plate 27. A plurality of openings 41 are formed in the diaphragm spring 40 through which project the shoulder rivets 31.

The integral rib 30 serves as a reaction member for the diaphragm spring 40 thereby transmitting spring load to the rib 28 on the pressure plate 27 to apply a clamping load on the driven member 16 between the pressure plate 27 and flywheel 10 to engage the clutch. The diaphragm spring 40 is shown having disengaging fingers 42 bent axially outwardly and away from the pressure plate 27 to provide centrifugal assist to the engaging force of the spring acting on the pressure plate.

Clutch releasing means 45 are shown which include a nonrotatable release carrier 46 which is actuated by a fork 47 pivoted on a ball stud 50 which is mounted on the clutch housing 26. The release carrier 46 is engaged with fork 47 and is adapted to move fore and aft axially on a support member 52 carried by the housing 26 to release and reengage the clutch.

A vent tube 53 is pressed in the release carrier 46 near the top and has its radially outermost end notched and covered by an inverted cup 54. The vent 53 connects to a passage 51 formed in the release carrier 46 and serves to equalize pressure between the inside of the cover plate assembly and the outside. The cup 54 prevents the exit of fluid when the engine stops and fluid drops from the top to the bottom of the clutch.

A nonrotating thrust washer 55 is shown including internal tangs 56 adapted to engage a series of slots 57 defined in the release carrier 46. The thrust washer 55 is backed by a shoulder 60 formed on the release carrier 46. The thrust washer 55 may be steel, faced with bearing material, or a steel plate with a separate loose washer of bearing material (as shown). The washer 55 is adapted to engage a steel plate 61 mounted to the disengaging fingers 42 of the diaphragm spring 40 by tangs 62 which engages slots 65 formed in the diaphragm spring 40. As is well understood, either a ball bearing or a radial roller bearing can be used in place of the thrust members described.

Seals 63 are provided disposed between the release carrier 46 and the support member 52 to prevent fluid from escaping from the carrier 46 and to insure a fluidtight sealed chamber. A clutch cover seal 64 is shown fixed in the cover plate 12 rotatable about the O. D. of the release carrier to prevent fluid from leaking out of the sealed rotatable chamber. A support member seal 68 is shown carried by the support member 52 to contact the output shaft 17 to seal the outer end of the support member.

Pumping means 66, here shown as a pitot tube pump, are located inside the cover plate 12. The pump 66 comprises one or more tubes 70 are connected to carrier 46. The tubes are formed having an inlet end 71 and an outlet end 72 connected to carrier 46. The tubes 70 are curved, and flattened and sharpened at their inlet end 71 to receive the fluid most efficiently and positioned such that the open inlet end 71 faces opposite the direction of rotation of the cover plate 12. The cooling fluid, due to the centrifugal force imparted to it by the rotating cover plate assembly, forms an annular band 73 on the inner periphery of the cover plate 12. The inertia of the rotating fluid causes the fluid to flow into the tube inlet 71 under pressure where it then flows to the outlet end 72 of the tube pump 66.

FIG. 2 shows a first fluid circuit 75 adapted to communicate cooling fluid from a fluid reservoir 76 to the friction facings 25. Valve means 78 are shown associated with the fluid reservoir 76 and functions basically as a pressure relief for the system. The first fluid circuit 75 includes a fluid conduit 77 connecting the fluid reservoir 76 and the release carrier 46, a fluid conduit 80 connecting the fluid conduit 77 and the release carrier 46 and a bypass valve 81 disposed in the conduit 80. A pair of fluid inlets 82 and 83 in the first fluid circuit are shown formed in the release carrier 46. A control orifice 84 is also shown formed in release carrier 46. An annular fluid chamber 85 is shown formed in the release carrier 46. A fluid passageway 86 is shown defined between the output shaft 17 and the support member 52. A port 87 is provided in the support member 52 connecting the fluid chambers 85 and 86.

A second fluid circuit 90 is shown adapted to connect the outlet end 72 of the tube pump 66 to the fluid reservoir 76. The fluid circuit 90 includes a passageway 91 connecting the outlet end 72 with a passageway 92 in communication with an annular chamber 95. A fluid outlet 96 is also shown formed in the release carrier 46. The fluid circuit 90 further includes a fluid conduit 97 connecting the fluid outlet 96 and the fluid reservoir 76, a liquid cooler 100 associated with the conduit 97 and a check valve 101 disposed in the conduit 97 between the cooler 100 and the outlet 96.

A control valve assembly 102 is shown carried by the release carrier 46 and includes a valve member 105 slidably disposed in a valve housing 106. The valve member consists of a head section 107 and a tapered end section 108. Resilient means here shown as a spring 110 is positioned between the valve member 105 and the valve housing 106 and is adapted to urge the valve member into its lowermost position as shown in FIG. 2. The valve member 105, in its lowermost position is adapted to contact a valve seat 111 formed in the valve housing 106 to block communication from the fluid inlet 82 to the annular chamber 85. The valve member 105 in its lowermost position is also effective to block communication from the port 92 to the fluid outlet 96. The control valve assembly 105, with the valve member 106 in its uppermost position as shown in FIG. 3, is adapted to allow communication from the inlet 82 to the annular chamber 85 and from the port 92 to the fluid outlet 96. An annular chamber 112 formed in the valve housing 106 is adapted to place the fluid inlet 83 in communication with the annular chamber 85 even when the valve member 105 is in its lowermost position.

An annular collector plate 115 is shown attached to the driven member 16 and serves to receive the fluid which exits from the fluid passageway 86 and disperses it radially outwardly toward the friction facings 25. A plurality of openings 116 are shown defined in the radial disc 22 and act to allow communication of the cooling fluid to both sides of the friction facings.

The operation of the embodiment shown in FIGS. 1 through 3 is as follows. With the prime mover at rest, the control valve assembly 102 with the valve member 105 in its lowermost position is shown in FIG. 2, acts to block communication from reservoir 76 to the chamber 85 and from the port 92 to the fluid outlet 96. To provide for initial priming of the system when there may be insufficient cooling fluid in the cover assembly 11 or the tube pump 66 to build up pressure to open the control valve assembly 102, the bypass conduit 80 is provided which circumvents the control valve 102 and permits fluid to flow directly from the reservoir 76 to the chamber 85. This ensures that the cover assembly will contain ample fluid to prime the pump and start normal circulation upon operation of the prime mover. The bypass valve 81 could be operated either manually or automatically to open when starting the prime mover and close when sufficient pressure has built up in the circuit. It would thereafter remain closed until the next start of the engine. The check valve 101 will also be closed when the prime mover is not running and is effective to prevent the fluid in he cooler 100 from draining back into the cover assembly only in the event valve 102 should leak to any degree.

Upon energization of the prime mover, the driving member 10 will rotate carrying with it the cover plate assembly 11. The cooling fluid which has accumulated in the bottom of the cover plate assembly will be acted on by centrifugal force imparted to it by the cover plate assembly and will form an annular band 73 on the inner periphery of the cover plate 12 in the sealed rotatable chamber. The cooling fluid is forced into the inlet end 71 of the tube pump 66 which is not rotating but is positioned in the path of the rotating fluid. The fluid then flows under pressure to the outlet end 72 of the tube pump 66 through passage 91 and to the port 92. When sufficient pressure is built up in he chamber 95 to overcome the force of the spring 110, the valve member 105 will be urged into its uppermost position as shown in FIG. 3 thereby allowing communication from the port 92 to fluid outlet 96. Once the control valve assembly 102 is open, fluid will flow from the fluid outlet 96 through conduit 97 and through check valve 101 which will then open. Fluid flows from the check valve 101 to the liquid cooler 100 which functions to cool the fluid. Fluid then flows from the cooler 100 to the fluid reservoir 76.

Fluid in the first fluid circuit 75 will flow from the fluid reservoir 76 to the fluid inlet 82 through conduit 77 either by gravity flow or pressure. Fluid flows through the control orifice 84 past the opened control valve assembly 102 into the annular chamber 85. Fluid flows from the annular chamber 85 through port 87 and through passageway 86. The annular collector plate 115 receives the fluid from the passageway 86 and disperses it radially outwardly. The openings 116 in the driven disc 22 permit some fluid to pass through the disc to the flywheel side. Fluid then passes across the friction surfaces 25 from I. D. to O. D. through clearance between the flywheel 10 and friction surface 25 and between the pressure plate 27 and friction surface 25 when the clutch is released, or through radial or similar the grooves in the facings when the clutch is engaged. After the cooling fluid has passed across the friction surfaces and removed heat generated by he clutch driving action, the cooling fluid will continue to collect on the inner periphery of the cover plate 12 to be picked up by the tube pump 66 and continue the circulation previously described.

The valve means 78 functions as a pressure relief in the system and acts to limit the fluid pressure in the system to a predetermined maximum by releasing excess air. When the prime mover increases its speed of rotation, the cooling fluid will move through the tube pump 66 at a greater velocity resulting in an increased pressure in the system. When the pressure exceeds the predetermined maximum, the valve means 78 will open and release excess air until the pressure drops within the prescribed limit. Such pressure regulation in conjunction with the flow control asserted by the control orifice 84 governs the flow of cooling fluid through the system and limits the flow to just that needed to properly cool the clutch. This arrangement provides sufficient cooling and reduces power loss at high speeds.

The clutch shown is of the diaphragm spring type. The spring 40 biases the pressure plate 27 to urge the driving 10 and driven 16 members into an engaged position. When release of the clutch is desired, the clutch linkage (not shown) will be activated to pivot the fork 47 on the ball stud 50 to move the release carrier 46 axially to the left as shown in FIG. 1. The circumferential rib 30 on the fulcrum plate 29 together with the shoulder rivets 31 form a two directional fulcrum for the diaphragm spring 40. The rib 30 serves as a reaction member for the diaphragm spring 40 thereby transmitting spring load to the rib 28 on the pressure plate 27 to apply clamping load on the driven member 16 by the pressure plate 27 and flywheel 10 to engage the clutch.

To release the clutch, load is applied to the diaphragm spring fingers 42 through the carrier 46 and thrust bearing 61 by the release fork 47. This load acting on the fulcrum provided by the round wire hoop 35 supported by the rivet heads 32 releases the diaphragm spring load from the pressure plate 27, thereby unloading the plate and releasing the clutch. The pressure plate 27 is retracted by the diaphragm spring 40 acting through the spring steel clips 37 bolted to the pressure plate 27. The spring clips 37 protrude through openings 36 in the fulcrum plate 29 and retract the pressure plate upon clutch release. Lugs 38 serve as means for driving the pressure plate 27 from the cover plate assembly 11.

FIGS. 4–7 show a modified embodiment of a liquid cooled friction clutch system. This system, for the most part, is similar to the system shown in FIGS. 1 through 3 with the exception that the control valve assembly in this embodiment is located in the nonrotatable support member 52. Like numbers are used to denote like elements.

Figure 5:
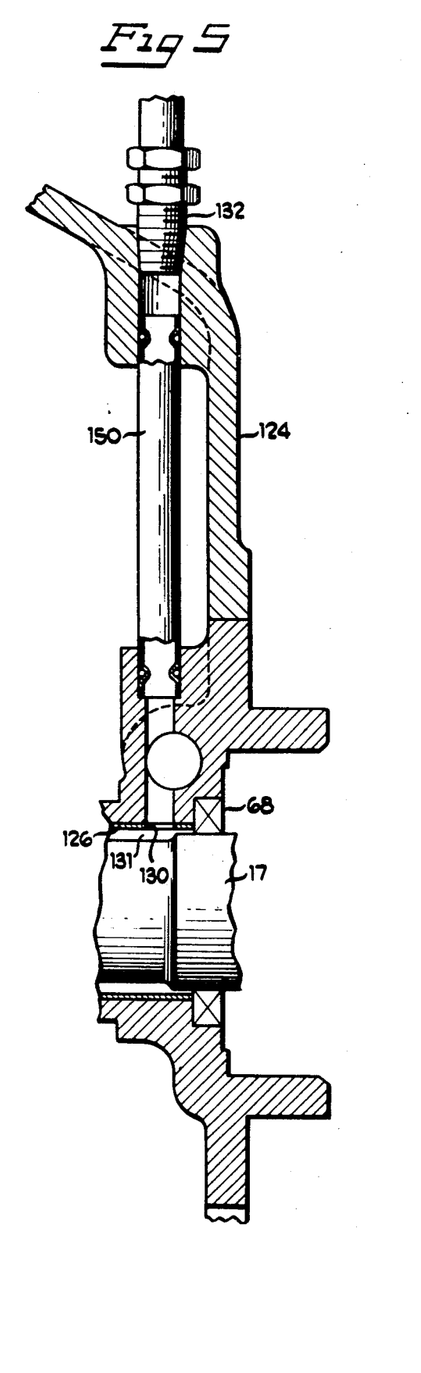
FIG. 5 is a partial view of the modified embodiment shown in FIG. 4.
Figure 6:
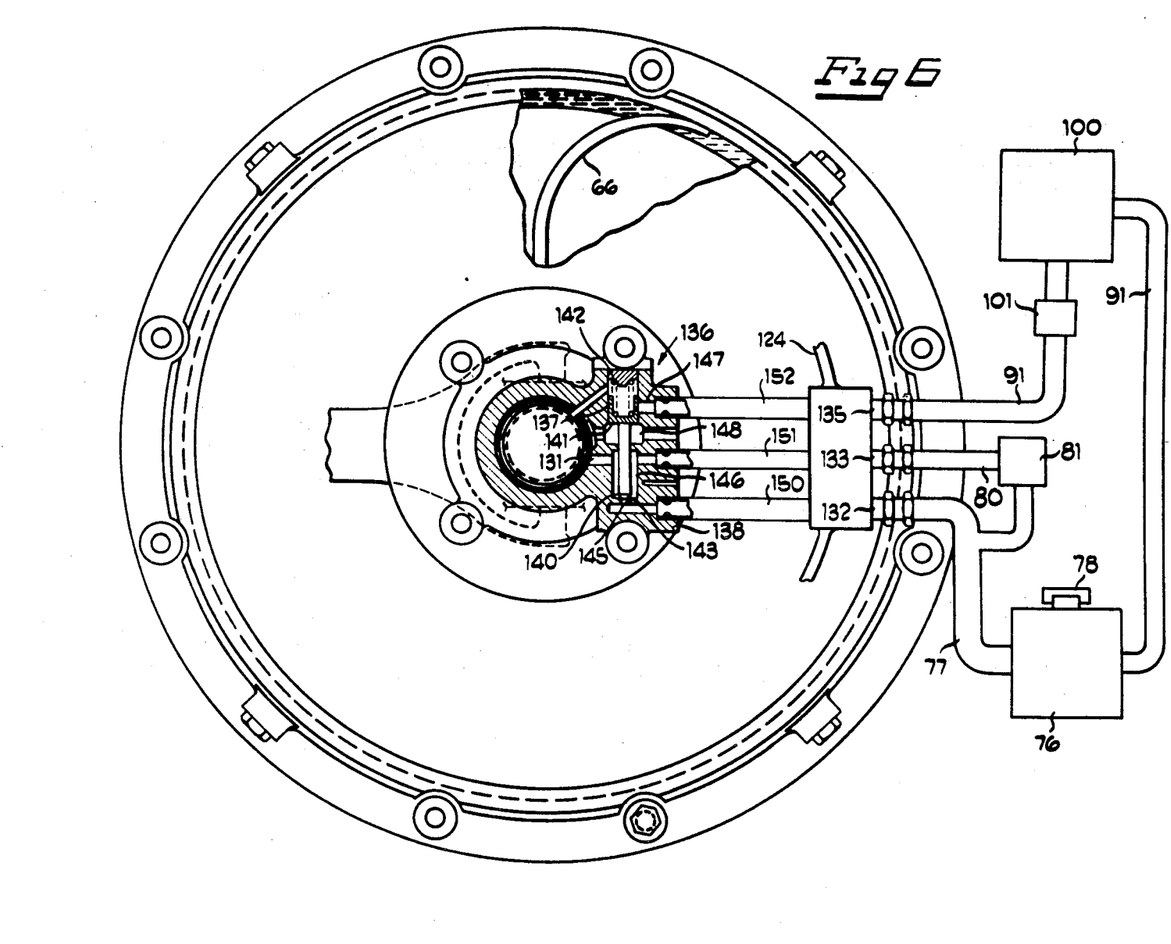
FIG. 6 is a front view partially in section of the embodiment shown in FIG. 4.

The pitot tube pump 66 is the same in structure and function as that pump previously described. The outlet end 72 of the pump 66 is attached to a release carrier 120. A conduit 121 is formed in the release carrier 120 and transfers fluid from the outlet end 72 of the pump 66 to an annular chamber 122 also formed in the release carrier 120. A nonrotatable support member 125 forms a part of the housing 124 and extends axially inwardly. An inner sleeve member 126 is shown coaxial with the support member 125 and in contact with the support member 125 at its inner diameter. A port 127 is formed in the support member 125 and serves to connect the annular chamber 122 with a chamber 128 defined between the support member 125 and the inner sleeve member 126. A port 130, best shown in FIG. 5, is formed in the inner sleeve 126 and is in communication with a chamber 131 defined between the inner sleeve 126 and the output shaft 17. A pair of fluid inlets 132 and 133 and a fluid outlet 135 are shown in FIG. 6 connected to the housing 124.

A control valve assembly 136 is shown carried by the support member 125. The control valve assembly 136 includes a valve member 137 slidably disposed in a valve housing 138. The valve member 137 includes a tapered end section 140 and a head section 141. Resilient means here shown as a spring 142 is shown disposed between the valve member 137 and the valve housing 138 and is adapted to urge the valve member 137 into its lowermost position as shown in FIG. 6. The valve member 137 in its lowermost position is adapted to contact a valve seat 143 formed in the housing 138.

Also formed in the valve housing 138 are a control orifice 145, a fluid entrance chamber 146, a fluid exit port 147 and a fluid exit chamber 148. A conduit 150 connects the fluid inlet 132 and the control orifice 145. A conduit 151 connects the fluid inlet 133 and the fluid entrance chamber 146. A conduit 152 connects the fluid exit port 147 and the fluid outlet 135.

The fluid conduit 77 connects the fluid reservoir 76 with the fluid inlet 132. The fluid conduit 80 connects the fluid conduit 77 and the fluid inlet 133. The bypass valve 81 is positioned in the fluid conduit 80. The fluid conduit 91 connects the fluid outlet 135 and the fluid reservoir 76. The fluid cooler 100 is disposed in the conduit 91 between the fluid outlet 135 and the fluid reservoir 76. The check valve 101 is disposed in the fluid conduit 91 between the fluid cooler 100 and the fluid outlet 135.

Figure 7:
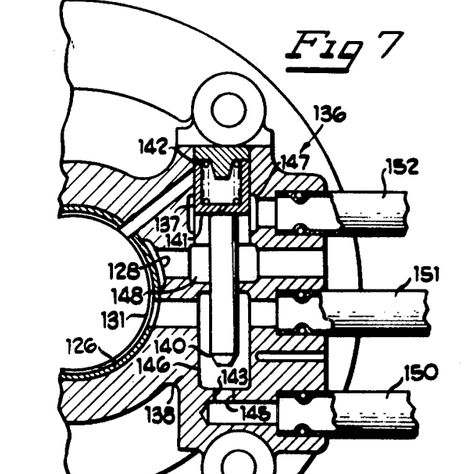
FIG. 7 is an enlarged partial sectional view of the embodiment shown in FIG. 6.

The operation of the embodiment shown in FIGS. 4 through 7, in summary, is as follows. Cooling fluid picked up by the inlet end 71 of the tube pump 66 flows under pressure through the tube pump 66 to the outlet end 72. Fluid is communicated from the outlet end 72 of the pump through conduit 121, chamber 122, port 127 and chamber 128 to the fluid exit chamber 148. Fluid pressure will build up in the fluid exit chamber 148 until it acts against the head section 141 of the valve member 137 with a force sufficient to overcome the force of the spring 142. At that point, the valve member 137 will be urged into its uppermost position as shown in FIG. 7, and communication will be established between the fluid exit chamber 148 and the fluid exit port 147. Communication will also be established between the control orifice 145 and the chamber 131. Fluid will then flow from the fluid exit port 147 through the conduit 152 to the fluid outlet 135, and then by way of conduit 91 through the check valve 101 through the fluid cooler 100 to the fluid reservoir 76. Fluid will then flow from the fluid reservoir 76 through the conduit 77, through the fluid inlet 132, through conduit 150, through control orifice 145, through chamber 131 and then to be carried to the friction surfaces as previously described. The valve means 78 associated with the reservoir 76 acts in conjunction with the control orifice 145 in the same manner previously described to limit the system flow and reduce power loss at high speeds.

Figure 8:
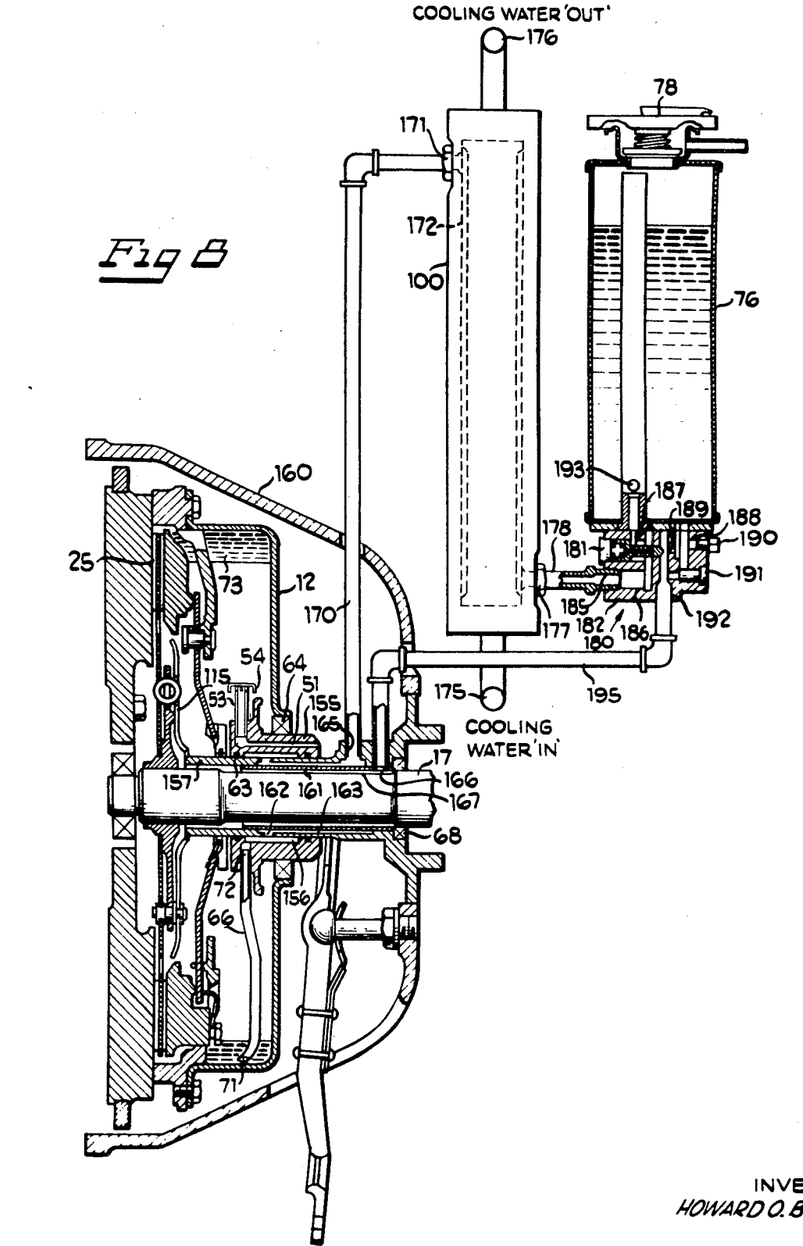
FIG. 8 is a side view of a modified embodiment of the present invention.

The embodiment of the liquid cooled friction clutch system shown in FIG. 8 is similar to that system shown in FIGS. 1 through 3 and previously described with the exception that the control valve assembly is now associated with the fluid reservoir. This arrangement provides for easy service of the control valve and results in the release carrier being less complicated.

The tube pump 66 is similar in structure and operation as that pump previously described. The tube pump 66 has its inlet end 71 disposed in the path of the rotating cooling fluid. The outlet end 72 of the tube pump 66 is affixed to a release carrier 155. A fluid chamber 156 is formed in the release carrier 155 and is in communication with the outlet end 72 of the tube pump 66. An inwardly extending nonrotatable support member 157 is fastened to the housing 160 and is coaxial with the output shaft 17. An inner sleeve member 161, coaxial with the support member 157 is in contact with the support member at its inner diameter. A port 162 is defined in the supporting member 157 and connects the fluid chamber 156 with a chamber 163 defined between the inner sleeve member 161 and the support member 157. A port 165 is formed in the support member 157 in communication with the chamber 163. A port 166 is defined in the inner sleeve member 161 and is in communication with a fluid chamber 167 defined between the output shaft 17 and the inner sleeve 161. A fluid conduit 170 connects the port 165 to a fluid inlet 171 of the liquid cooler 100.

The liquid cooler 100 is here shown as a tubular tank through which cooling water flows and in which is submerged a common tubular type oil cooler element 172. The liquid cooler 100 has an inlet 175 and an outlet 176 through which cooling water is passed. An outlet 177 is connected to the cooler 100 through which the cooling fluid passes. A fluid conduit 178 connects the outlet 177 to a control valve assembly 180 which is associated with the fluid reservoir 76.

The control valve assembly 180 includes a valve member 181 slidably disposed in a valve housing 182. An inlet 185 is shown associated with the housing 182. A fluid chamber 186 is defined by the housing in communication with the fluid inlet 185. A fluid passage 187 is shown in communication with the fluid reservoir 76. A fluid passageway 188 is formed in the housing 182 in communication with the fluid reservoir 76. A control orifice 189 is formed in the housing 182 in communication with passageway 188 and is also operative to act as a valve seat for valve 180. A screw plug 190 is connected to the housing 182 and is in communication with the fluid chamber 188. This provides a position for connecting a pressure gauge if such is deemed desirable. A screw plug 191 acting as a shut off valve is connected in the valve housing 182 and can be unscrewed part way for priming purposes.

A fluid outlet 192 is shown in the housing 182 in communication with control orifice 189. A ball check 193 is provided in communication with the fluid passage 187 to prevent oil from the reservoir 76 from draining back into the clutch system when the engine is not in operation should valve 181 not seal tightly. A fluid conduit 195 connects the outlet 192 to the port 166 and carries fluid from the fluid reservoir 76 to the chamber 167 from which it is discharged to flow across the friction surfaces. The valve means 78 is shown here as a pressure cap attached to the fluid reservoir 76.

The operation of the embodiment shown in FIG. 8, in summary, is as follows. The inlet end 71 of the tube pump 66 is disposed in the path of the cooling fluid 73 which is carried at the inner periphery of the cover plate 12. Fluid is forced into the inlet end 71 of the tube pump 66 and carried through the tube pump 66 by pressure. Fluid flows from the outlet end 72 of the pump into annular chamber 156 through port 162, through chamber 163 and through conduit 170 into the oil cooler 100. The fluid, after being cooled, leaves the cooler through outlet 177, flows through conduit 178 and enters the control valve assembly 180 at inlet 185. When sufficient pressure is built up within the chamber 186, the pressure will act against the head section of the valve member 181 to overcome the force exerted by the spring and urge the valve member 181 into its open position as illustrated in FIG. 8. Communication is now established between the chamber 186 and the passage 187 and fluid flows into the fluid reservoir 76 pass the ball check 193.

With the valve member 181 in its open position, as shown in FIG. 8, fluid will leave the reservoir 76, enter chamber 188, flow through the control orifice 189 and leave the control valve assembly 180 through fluid outlet 192. Fluid will then pass through conduit 195 into port 166 and from there flow to the chamber 167. Fluid flows from chamber 167 along the output shaft 17 to the collector plate 115 where it is radially dispersed to flow across the friction surfaces 25 and dissipate heat generated by the friction drive. After the fluid flows across the friction facings, it is then carried by the cover plate assembly as previously described. The valve means 78, associated with the fluid reservoir 76, acts in conjunction with control orifice 189 in the manner previously described to limit the system flow and reduce power loss at high speeds.

Thus it has been shown that a fluid cooled friction clutch system is provided whereby all clutch components, release mechanism and circulating pump are confined within a single enclosure which is attached and sealed on the flywheel. Further, a clutch cooling system has been provided incorporating a simple ram tube pump and appropriate valving to regulate the system flow to a predetermined maximum value and to minimize power loss at high speeds.

Various of the features of the invention have been particularly shown and described. However, it should be obvious to one skilled in the art that various modifications may be made therein without departing from the scope of the invention.

What is claimed is:

1. A liquid cooled friction clutch system including a rotatable driving member connected to a prime mover; a driven member adapted to be connected to an output shaft; friction surfaces carried by said driven member; a cover plate assembly connected to said driving member; a housing enclosing said driving and driven members; pressure applying means drivingly associated with said cover plate assembly and adapted to place said driven member into engagement with said driving member; resilient means associated with said pressure applying means adapted to normally urge said driving and driven members into engagement; a nonrotatable support member carried by said housing; nonrotatable releasing means coaxial with said output shaft and axially slidable on said nonrotatable support member, said releasing means adapted to disengage said driving and driven members; a fluid reservoir adapted to contain a cooling fluid; a first fluid circuit adapted to communicate cooling fluid from said reservoir to said friction surfaces; pumping means comprising a fluid conduit having an inlet end in communication with an inner periphery of said cover plate assembly, and an outlet end connected to said releasing means whereby said pumping means is effective to circulate cooling fluid through the system; a second fluid circuit adapted to communicate cooling fluid from said pumping means to said fluid reservoir.

2. A liquid cooled friction clutch system as in claim 1 including fluid cooling means disposed in one of said fluid circuits.

3. A liquid cooled friction clutch system as in claim 1 including valve means in said system operative to block fluid flow from said pump means until a predetermined pressure is generated by said pumping means in said system.

4. A liquid cooled friction clutch system as in claim 1 including valve means in communication with said first fluid circuit operative to block communication between said fluid reservoir and said friction surfaces in the absence of relative rotation between said driving member and said pumping means.

5. A liquid cooled friction clutch system as in claim 1 including valve means in communication with said second fluid circuit operative to block communication between said pumping means and said fluid reservoir in the absence of relative rotation between said driving member and said pumping means.

6. A liquid cooled friction clutch system as in claim 1 including valve means in communication with said first and second fluid circuits adapted to block communication between said fluid reservoir and said friction surfaces and between said pumping means and said fluid reservoir in the absence of relative rotation between said driving means and said pumping means.

7. A liquid cooled friction clutch system as in claim 1 including a control orifice associated with said first fluid circuit, said orifice adapted to control the flow of fluid from said fluid reservoir to said friction surfaces.

8. A liquid cooled friction clutch system as in claim 3 in which said valve means is carried by said releasing means.

9. A liquid cooled friction clutch system as in claim 3 in which said valve means is carried by said nonrotatable support member.

10. A liquid cooled friction clutch system as in claim 3 in which said valve means is associated with said fluid reservoir.

11. A liquid cooled friction clutch system as in claim 6 in which said valve means is carried by said releasing means.

12. A liquid cooled friction clutch system as in claim 6 in which said valve means is carried by said nonrotatable support member.

13. A liquid cooled friction clutch system as in claim 6 in which said valve means is associated with said fluid reservoir.

14. A liquid cooled friction clutch system as in claim 4 including means in one of said fluid circuits to selectively bypass said valve means.

15. A liquid cooled friction clutch system as in claim 1 including valve means in communication with at least one of said first and second fluid circuits adapted to limit the fluid pressure in said circuit to a predetermined maximum and to thereby limit the flow of fluid from said fluid reservoir to said friction surfaces to a predetermined maximum.

16. A liquid cooled friction clutch system as in claim 15 in which said valve means is associated with said fluid reservoir.

17. A liquid cooled friction clutch system as in claim 1 including valve means in communication with at least one of said first and second fluid circuits adapted to limit the fluid pressure in said system to a predetermined maximum, and including a control orifice associated with at least one of said first and second fluid circuits whereby said valve means in conjunction with said control orifice limit the flow of fluid from said fluid reservoir to said friction surfaces to a predetermined maximum.

18. A liquid cooled friction clutch system as in claim 1 including vent means disposed between an inside of said cover plate assembly and an outside of said cover plate assembly adapted to equalize the pressure therebetween.

19. A liquid cooled friction clutch system as in claim 18 in which said vent means is carried by said nonrotatable releasing means.

20. A liquid cooled friction clutch system including a rotatable driving member connected to a prime mover; a driven member adapted to be connected to an output shaft; friction surfaces carried by said driven member; a cover plate assembly connected to said driving member, said cover plate assembly and said driving member forming a sealed rotatable chamber; a housing enclosing said rotatable chamber, said housing being of the dry-sump type; pressure applying means drivingly associated with said cover plate assembly and adapted to place said driven member into engagement with said driving member; resilient means associated with said pressure applying means adapted to normally urge said driving and driven members into engagement; a nonrotatable support member carried by said housing; nonrotatable releasing means coaxial with said output shaft and axially slidable on said nonrotatable support member, said releasing means adapted to disengage said driving and driven members; a fluid reservoir adapted to contain a cooling fluid; a first fluid circuit adapted to communicate cooling fluid from said reservoir to said friction surfaces; pumping means comprising a fluid conduit having an inlet end within said rotatable chamber in communication with an inner periphery of said cover plate assembly, and an outlet end connected to said releasing means whereby said pumping means is effective to circulate cooling fluid through the system; a second fluid circuit adapted to communicate cooling fluid from said pumping means to said fluid reservoir.

21. A liquid cooled friction clutch system as in claim 20 including fluid cooling means disposed in one of said fluid circuits.

22. A liquid cooled friction clutch system as in claim 20 including valve means in said system operative to block fluid flow from said pump means until a predetermined pressure is generated by said pumping means in said system.

23. A liquid cooled friction clutch system as in claim 20 including valve means in communication with said first fluid circuit operative to block communication between said fluid reservoir and said friction surfaces in the absence of relative rotation between said driving members and said pumping means.

24. A liquid cooled friction clutch system as in claim 20 including valve means in communication with said second fluid circuit operative to block communication with between said pumping means and said fluid reservoir in the absence of relative rotation between said driving member and said pumping means.

25. A liquid cooled friction clutch system as in claim 20 including valve means in communication with said first and second fluid circuits adapted to block communication between said fluid reservoir and said friction surfaces and between said pumping means and said fluid reservoir in the absence of relative rotation between said driving means and said pumping means.

26. A liquid cooled friction clutch system as in claim 20 including a control orifice associated with said first fluid circuit, said orifice adapted to control the flow of fluid from said fluid reservoir to said friction surfaces.

27. A liquid cooled friction clutch system as in claim 22 in which said valve means is carried by said releasing means.

28. A liquid cooled friction clutch system as in claim 22 in which said valve means is carried by said nonrotatable support member.

29. A liquid cooled friction clutch system as in claim 22 in which said valve means is associated with said fluid reservoir.

30. A liquid cooled friction clutch system as in claim 25 in which said valve means is carried by said releasing means.

31. A liquid cooled friction clutch system as in claim 25 in which said valve means is carried by said nonrotatable support member.

32. A liquid cooled friction clutch system as in claim 25 in which said valve means is associated with said fluid reservoir.

33. A liquid cooled friction clutch system as in claim 23 including means in one of said fluid circuits to selectively bypass said valve means.

34. A liquid cooled friction clutch system as in claim 20 including valve means in communication with at least one of said first and second fluid circuits adapted to limit the fluid pressure in said circuit to a predetermined maximum and to thereby limit the flow of fluid from said fluid reservoir to said friction surfaces to a predetermined maximum.

35. A liquid cooled friction clutch system as in claim 34 in which said valve means is associated with said fluid reservoir.

36. A liquid cooled friction clutch system as in claim 20 including valve means in communication with at least one of said first and second fluid circuits adapted to limit the fluid pressure in said system to a predetermined maximum, and including a control orifice associated with at least one of said first and second fluid circuits whereby said valve means in conjunction with said control orifice limit the flow of fluid from said fluid reservoir to said friction surfaces to a predetermined maximum.

37. A liquid cooled friction clutch system as in claim 20 including vent means disposed between an inside and an outside of said sealed rotatable chamber adapted to equalize the pressure therebetween.

38. A liquid cooled friction clutch system as in claim 37 in which said vent means is carried by said nonrotatable releasing means.